Feb. 21, 1961   A. BEN-EZRA ET AL   2,972,534
SUBBING OF POLYSTYRENE FILMBASE
Filed April 23, 1957
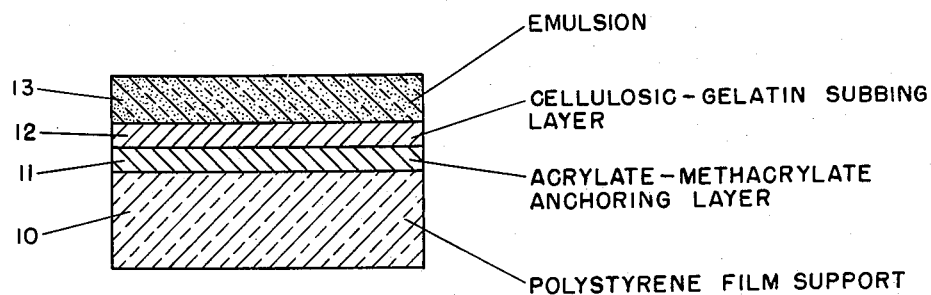
AARON BEN-EZRA
LLOYD BOSTWICK
            INVENTORS
BY
    ATTORNEYS & AGENT

United States Patent Office 2,972,534
Patented Feb. 21, 1961

2,972,534
SUBBING OF POLYSTYRENE FILMBASE

Aaron Ben-Ezra, Johnson City, and Wallace Lloyd Bostwick, Vestal, N.Y., assignors to General Aniline & Film Corporation, New York, N.Y., a corporation of Delaware Filed Apr. 23, 1957, Ser. No. 654,554

5 Claims. (Cl. 96—84)

This invention relates to photographic film and particularly to the subbing of polystyrene resin film supports.

Polystyrene has many properties which would tend to recommend its use for the manufacture of photographic film supports. Sheets prepared by the extrusion of polystyrene and subsequent bi-axial orientation have exceptional flexibility and strength. Their resistance to dimensional changes brought on by changes in humidity and temperature is extraordinary when compared with that of film supports of cellulose derivatives and many other film forming resins including polyvinyl resin. For these reasons, films of polystyrene resin would be ideally suited for use in the reproduction industries where glass plates must often be used to insure dimensional stability and where an improved film support of better dimensional stability would definitely be desired.

Despite these obvious advantages, polystyrene film supports did not find acceptance by the photographic industry for many years because the problem of anchoring a gelatino silver-halide emulsion to a polystyrene resin film support could not be satisfactorily solved. The commonly used subbing layers were incompatible with the polystyrene base and even attempts to use a variety of substances for intermediate layers between the support and the subbing layer proved unsuccessful. All kinds of defects occurred which included the formation of blush, crazing and cracking once the emulsion layer was applied. The most discouraging defects were noticed during and after development of the film when the emulsion layer peeled off in the processing solutions or flaked off whenever the film base was flexed after drying.

It is an object of the present invention to provide a method of subbing polystyrene resin film which precludes the peeling and the flaking off of the gelatino light-sensitive silver-halide emulsion layer coating. Another object is to provide a photographic film on a polystyrene support with satisfactory anchoring and adhesion of the emulsion to the polystyrene support.

Other objects and advantages will appear from the following description.

We have found that a photographic film meeting these qualifications can be prepared by coating a polystyrene film support with a solution containing the copolymer of methyl or ethyl acrylate and methyl or ethyl methacrylate in a low boiling solvent mixture; and then overcoating the dried alkyl acrylatealkyl methacrylate coating with a layer of a cellulosic sub such as cellulose nitrate and gelatin, followed by the emulsion layer. If desired a small amount of a cellulose ester such as cellulose nitrate, cellulose acetate or cellulose acetate butyrate, or of a vinyl derivative such as copolymer of vinyl chloride and vinyl acetate can be added to the solution of the acrylic copolymer.

The polystyrene film bases which are provided with the subbing layers of the present invention are commercially available and are generally prepared by the extrusion method followed by lengthwise and lateral stretching to provide axial orientation.

The copolymers of alkyl acrylate and alkyl methacrylate which are used in the preparation of the anchoring layers are prepared by the copolymerization of methyl or ethyl acrylate and methyl or ethyl methacrylate in the presence of an organic peroxide under the action of heat and light following the procedures and conditions described in United States Patents 1,937,323 and 2,123,599. While all four of the possible copolymers have been found to be suitable for use in the anchoring layer, it was noted that best results were obtained when copolymers were employed which had been prepared from mixtures containing between 10 and 40 percent of ethyl methacrylate and 60 to 90 percent methyl acrylate. Copolymers which can be used in accordance with our invention are also available commercially as solids and are sold, inter alia, as Acryloid B–66, Acryloid B–72 and Acryloid B–82 by Rohm and Haas. Their general properties are described in "Industrial & Engineering Chemistry," vol. 28, pages 635–639 (1936).

These acrylate-methacrylate copolymers are soluble in a great number of solvents including alcohols, e.g., methanol, ethanol, propanol, isopropanol, and sec-butanol; ketones, e.g., acetone; esters, e.g., methyl acetate, ethyl acetate, ethyl lactate and methyl cellosolve (the methyl ether of ethylene glycol mono acetate). Best results are obtained by the use of solvent mixtures, particularly those of acetone and methanol which may be used at the ratio of from 50 to 70 volume percent of acetone and from 30 to 50 percent of methanol; the range from 60 to 65 volume percent of acetone and from 35 to 40 volume percent of methanol constituting the preferred ratios.

The preferred copolymer solutions used in accordance with our invention are characterized by the following formulation.

Ethyl methacrylate-methyl acrylate copolymer
gms__ 75–250
Acetone _____cc__ 600–650
Methanol _____cc__ 350–400

When a film is to be prepared having a gelatin non-curling backing or antihalation layer and a light-sensitive gelatin silver-halide emulsion layer, the anchoring and cellulosic gelatin subbing layer may be applied to both sides of the polystyrene film base. Such cellulosic-gelatin sub layers which are well-known to persons skilled in the art are prepared from dispersions of gelatin and a cellulose ester in a suitable solvent mixture containing water and one or more low boiling solvents which are miscible with water. The subbing solutions described in Orinik's United States Patent 2,593,912 which contain a predermined amount of an organic gelatin hardening agent are preferred. Whenever the gelatinous emulsion or antihalation layer contains an organic hardening agent, the thickness of the anchoring and subbing layers depends on the viscosity of the coating solutions and on the speed with which they are coated. Generally, anchoring layers having a thickness ranging from 2–8 microns and subbing layers having a thickness of from 0.3 to 1 micron have been found to be most satisfactory.

The invention will be further illustrated but is not intended to be limited by the following examples:

Example 1

Twenty-five grams of monomeric ethyl methacrylate and 125 grams of monomeric methyl acrylate dissolved in 100 grams of benzene were heated under reflux for 12 hours in the presence of 0.1 gram of benzoyl peroxide. The benzene was distilled off and the resultant clear ethyl methacrylate-methyl acrylate copolymer dissolved in 650 cc. of acetone and 350 cc. of methanol. This solution was applied to a film base support of polystyrene commercially available under the trade name of "Polyflex" (Plax Corporation) and having a thickness of 0.010 inch (255 microns) at a speed of 2 feet per minute.

After drying, a cellulose nitrate gelatin subbing solution having the following composition was coated over the acrylate layer.

| | | |
|---|---|---|
| Gelatin | gms | 1.0 |
| Water | mls | 2.0 |
| Methanol | mls | 80.0 |
| Phthalic acid | gm | 0.25 |
| Ethanol | mls | 19.0 |
| Glycerine | ml | 0.5 |
| Barium sulfate | gm | 0.25 |
| Glyoxal | ml | 0.2 |
| Cellulose nitrate | gms | 2.0 |

(Nitrogen: 11 percent; viscosity ASTM D 301–50: 4–5 seconds.)

The subbing layer was dried and then overcoated with a hardened, high contrast gelatino silver-halide emulsion of the type used in "Ansco Reprolith Film." After drying and storage for several months, the emulsion adhered tenaciously to the polystyrene support, did not crack when flexed, did not peel off during or after processing and did not give any indication of crazing, cracking or other surface blemishes.

*Example II*

Example I was repeated with the exception that the copolymer used therein replaced by 140 grams of a commercially available ethyl methacrylate-methyl acrylate copolymer sold in granular form by Rohm and Haas under the trade name of "Acryloid B-72." The film obtained had excellent dimensional stability and emulsion adherence during storage and did not show any surface defects whatsoever after photographic processing.

*Example III*

Example I was repeated except that an inter polymer was used which had been prepared from 30 parts of monomeric ethyl acrylate and 70 parts of monomeric methyl methacrylate while using the reaction condition described in Example 14 of United States Patent 2,123,599. The finished film had the same satisfactory properties as the film of Example I.

*Example IV*

A "Polyflex" polystyrene film base support, .005" (125 microns) thick was coated successively on both sides at 1.5 f.p.m. with the following composition:

| | | |
|---|---|---|
| Methyl Cellosolve | mls | 24.5 |
| Acetone | mls | 20.0 |
| Ethanol | mls | 11.0 |
| Ethyl lactate | mls | 7.0 |
| Methyl acetate | mls | 12.0 |
| Isobutanol | mls | 6.0 |
| Ethyl methacrylate-methyl acrylate copolymer (Rohm and Haas "Acryloid" B-72) | gms | 18.0 |
| Cellulose acetate butyrate | gms | 2.0 |

(14 percent acetyl, 37 percent butyryl; intrinsic viscosity in acetone: 0.75 at 25° C.)

After drying, each of the anchoring layers had a thickness of 3 microns. The following subbing composition was then applied at 2 f.p.m. to both sides of the treated film:

| | | |
|---|---|---|
| Gelatin | gm | 1.0 |
| Water | mls | 2.0 |
| Methanol | mls | 80.0 |
| Salicylic acid | gm | 0.25 |
| Ethanol | mls | 14.0 |
| Glycerine | gm | 0.5 |
| Barium sulfate | gm | 0.25 |
| Glyoxal | gm | 0.2 |
| Cellulose nitrate | gms | 2.0 |

The sub coatings had a thickness of 0.5 micron after drying. A gelatin antihalation layer and a gelatin silver-halide emulsion layer were applied over the subbed layers in the usual manner. Adhesion of the antihalation and silver-halide emulsion layers to the film support was excellent, and the fully processed and dried film did not show any defects or blemishes.

Our invention is further illustrated by the accompanying drawing in which a polystyrene support 10 is coated successively with an alkyl acrylate-alkyl methacrylate copolymer layer 11, a cellulosic gelatin subbing layer 12 and a gelatin silver-halide emulsion layer 13.

Various modifications of this invention will occur to persons skilled in the art and we therefore do not intend to be limited in the patent granted except as necessitated by the appended claims.

We claim:

1. A light-sensitive photographic element comprising a polystyrene film support carrying in the following order an anchoring layer comprising a copolymer obtained by the copolymerization of a mixture consisting of an alkyl ester of acrylic acid and an alkyl ester of methacrylic acid wherein the number of carbon atoms in said alkyl group is a positive whole number which does not exceed two, a subbing layer comprising gelatin and a cellulose ester, and a silver halide emulsion layer.

2. A light-sensitive photographic film comprising a polystyrene support carrying thereon in the order specified an anchoring layer comprising a binary interpolymer obtained by the copolymerization of a mixture consisting of (1) a compound selected from the group consisting of methyl acrylate and ethyl acrylate and (2) a compound selected from the group consisting of methyl methacrylate and ethyl methacrylate, a subbing layer comprising gelatin and a cellulose ester, and a gelatin silver halide emulsion layer.

3. A photographic film comprising a polystyrene base carrying thereon in the following order, an anchoring layer comprising a binary copolymer obtained by the copolymerization of a mixture consisting of ethyl methacrylate and methyl acrylate, a gelatin subbing layer comprising gelatin and a cellulose ester, and a gelatinous silver-halide emulsion layer.

4. A photographic film comprising a transparent polystyrene base, provided on both sides in the following order with an anchoring layer comprising a binary copolymer of ethyl methacrylate and methyl acrylate and with a subbing layer comprising a cellulose ester and gelatin, one of said subbing layers carrying a gelatinous antihalation layer and the other subbing layer carrying a gelatinous light-sensitive silver-halide emulsion layer.

5. A photographic film as defined by claim 2, wherein said anchoring layer contains in addition to said interpolymer a small amount of a cellulose ester selected from the group consisting of cellulose nitrate, cellulose acetate and cellulose acetate butyrate.

References Cited in the file of this patent

UNITED STATES PATENTS

| 2,388,817 | Beguin et al. | Nov. 13, 1945 |
| 2,698,235 | Swindells | Dec. 28, 1954 |
| 2,794,742 | Fowler et al. | June 4, 1957 |